US008648866B2

(12) United States Patent
Ting et al.

(10) Patent No.: US 8,648,866 B2
(45) Date of Patent: Feb. 11, 2014

(54) FACIAL ANIMATION SYSTEM AND PRODUCTION METHOD

(75) Inventors: Wen-Hung Ting, Guiren Township, Tainan County (TW); Chen-Lan Yen, Tainan (TW); Wen-Liang Chi, Kouhu Township, Yunlin County (TW); Duan-Li Liao, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 795 days.

(21) Appl. No.: 12/831,666

(22) Filed: Jul. 7, 2010

(65) Prior Publication Data

US 2011/0141105 A1 Jun. 16, 2011

(30) Foreign Application Priority Data

Dec. 16, 2009 (TW) ............................... 98143200 A (51) Int. Cl.
*G06T 13/00* (2011.01)
*G06T 1/00* (2006.01)
*G06F 17/00* (2006.01)

(52) U.S. Cl.
USPC ............ 345/473; 345/418; 345/474; 345/475

(58) Field of Classification Search
None
See application file for complete search history.

(56) References Cited

U.S. PATENT DOCUMENTS

| 6,272,231 | B1 | 8/2001 | Maurer et al. | |
|---|---|---|---|---|
| 6,806,898 | B1 | 10/2004 | Toyama et al. | |
| 7,123,262 | B2 * | 10/2006 | Francini et al. | 345/473 |
| 2003/0160786 | A1 * | 8/2003 | Johnson | 345/419 |
| 2008/0063236 | A1 | 3/2008 | Ikenoue et al. | |
| 2009/0153552 | A1 | 6/2009 | Fidaleo et al. | |
| 2009/0153569 | A1 | 6/2009 | Park et al. | |
| 2010/0259546 | A1 * | 10/2010 | Yomdin et al. | 345/473 |

OTHER PUBLICATIONS

Demetri Terzopoulos and Keith Waters, Physically-Based Facial Modeling, Analysis, and Animation, the Journal of Visualization and Computer Animation, 1(2):73-80, 1990.*

* cited by examiner

*Primary Examiner* — Kee M Tung
*Assistant Examiner* — Haixia Du
(74) *Attorney, Agent, or Firm* — McClure, Qualey & Rodack, LLP (57) ABSTRACT

A facial animation production method for producing 3-dimensional (3D) facial animation data in response to input video data includes the following steps. First, data positioning and character sorting processes are performed on the input video data to acquire first-layer character data, for indicating multiple first-layer character points, and first-layer model data. Next, first-layer model outline data and first-layer character outline data are respectively obtained according to the first-layer model data and the first-layer character data. Then, the first-layer character outline data is compared with the first-layer model outline data to judge whether a judgment condition is satisfied. If not, output character data are produced according to the first-layer character data, and fundamental facial-mesh transformation data are thus produced. Thereafter, the 3D facial animation data are displayed according to the fundamental facial-mesh transformation data.

24 Claims, 10 Drawing Sheets

FACIAL ANIMATION SYSTEM AND PRODUCTION METHOD

This application claims the benefit of Taiwan application Serial No. 098143200, filed Dec. 16, 2009, the subject matter of which is incorporated herein by reference.

TECHNICAL FIELD

The disclosure relates in general to a facial animation system, and more particularly to a facial animation system having the multi-layer facial character detecting function.

BACKGROUND

For a user or an animal, the facial variation pertains to the most instinctive and severe visual experience. Therefore, in the field of using the interaction interface in the communication system, it is always one direction, which is continuously developed in the industry to drive a 3-dimensional (3D) facial model by the video of the user or animal. In the existing art, the 3D model transformation is calculated according to the facial reliable character points of the user or animal so as to drive the 3D facial animation. Generally speaking, many reliable character points have to be adopted so that the natural and fine 3D facial animation can be produced.

However, the acquisition of the character points relies on the two-dimensional video data. If the reliable character information cannot be provided in the two-dimensional image, the character points are mis-judged and the produced facial animation is inconsistent with the actual facial image. If the character points are obtained from the less information to drive/produce the facial animation, the inconsistency between the facial animation and the facial image may be reduced, but the animation similarity may become insufficient. Thus, it is an important direction to get the balance between the video data quantity and the facial animation similarity.

SUMMARY

An embodiment of the disclosure is directed to a facial animation system, which adopts a multi-layer character verifying mechanism to verify the character point information produced according to a two-dimensional facial image. Also, the system can selectively obtain the character point information with different fineness levels according to two-dimensional facial images with different image qualities. Thus, compared with the conventional 3D facial animation system, the facial animation system of the disclosure can effectively ensure that the referred character points are correct and ensure the reliable character point information, and can produce the 3D facial animation with the higher quality.

According to a first embodiment of the present disclosure, a facial animation system for producing 3-dimensional (3D) facial animation data in response to input video data is provided. The facial animation system includes a display module, a transformation calculating module, a character acquiring device and a character verifying device. The character acquiring device performs data positioning and character sorting operations on the input video data to acquire first-layer character data, for indicating a plurality of first-layer character points, and first-layer model data. The character verifying device obtains first-layer model outline data according to the first-layer model data, and obtains first-layer character outline data according to the first-layer character data. The character verifying device further compares the first-layer character outline data with the first-layer model outline data to judge whether the first-layer character outline data and the first-layer model outline data satisfy a judgment condition. When the first-layer character outline data and the first-layer model outline data do not satisfy the judgment condition, the character verifying device outputs the first-layer character data, as output character data, to the transformation calculating module. The transformation calculating module produces fundamental facial-mesh transformation data according to the output character data, and thus drives the display module to display the 3D facial animation data.

According to a second embodiment of the present disclosure, a facial animation production method for producing 3-dimensional (3D) facial animation data in response to input video data is provided. The facial animation production method includes the following steps. First, data positioning and character sorting processes are performed on the input video data to acquire first-layer character data, for indicating a plurality of first-layer character points, and first-layer model data. Next, first-layer model outline data are obtained according to the first-layer model data, and first-layer character outline data are obtained according to the first-layer character data. Then, the first-layer character outline data are compared with the first-layer model outline data to judge whether the first-layer character outline data and the first-layer model outline data satisfy a judgment condition. Next, output character data are produced according to the first-layer character data, and fundamental facial-mesh transformation data are thus produced when the first-layer character outline data and the first-layer model outline data do not satisfy the judgment condition. Then, the 3D facial animation data are displayed according to the fundamental facial-mesh transformation data.

The embodiments will become apparent from the following detailed description of the preferred but non-limiting embodiments. The following description is made with reference to the accompanying drawings.

DESCRIPTION OF EMBODIMENTS

The facial animation system according to each embodiment of the disclosure adopts a character verifying device to perform the multi-layer verification operations on the character data.

First Embodiment

Figure 1:
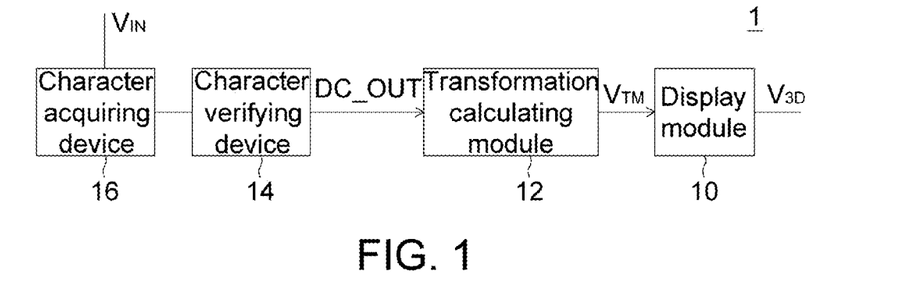
FIG. 1 is a block diagram showing a facial animation system according to a first embodiment of the disclosure.

FIG. 1 is a block diagram showing a facial animation system 1 according to a first embodiment of the disclosure. The facial animation system 1 of this embodiment produces 3-dimensional (3D) facial animation data $V_{3D}$ in response to input video data $V_{IN}$. The facial animation system 1 includes a display module 10, a transformation calculating module 12, a character verifying device 14 and a character acquiring device 16. The input video data $V_{IN}$ is for displaying a two-dimensional (2D) facial image.

The character acquiring device 16 performs data positioning and character sorting operations on the input video data $V_{IN}$ to roughly obtain positions of facial character points and acquire character data for indicating multiple character points, wherein each character point defines an edge of each facial character, such as eye, nose, mouth and ear. For example, the input video data $V_{IN}$ has the higher pixel data gradient or gray level difference at the edge of each facial character. Thus, the character acquiring device 16 finds the character point defining each facial character according to the peak value of the variance of the pixel data gray level of the input video data $V_{IN}$.

Figure 2:
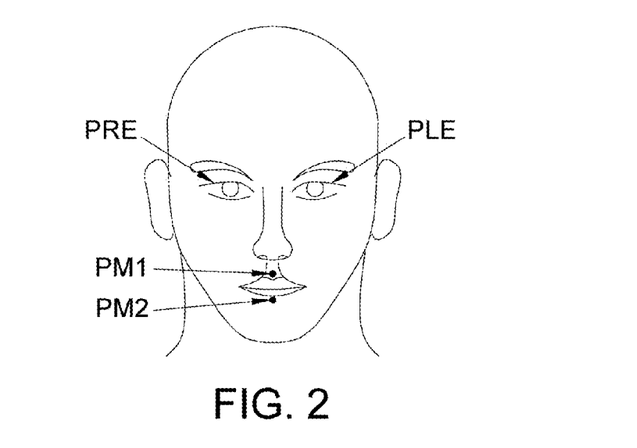
FIG. 2 is a schematic illustration showing first-layer character data DC_L1.

The character data acquired by the character acquiring device 16 may be divided into several layers according to its fineness degree. In the initial condition, the character acquiring device 16 only acquires the character data corresponding to the first-layer character point. For the first-layer character data DC_L1 (i.e., the lowest layer character data), it uses the fewest character points to describe the facial character in the input video data $V_{IN}$. In one example embodiment, the first-layer character data DC_L1 include the information of the character points PM1, PM2, PLE and PRE, respectively representing the positions of the upper edge of mouth, the lower edge of mouth, the left eye and the right eye in the two-dimensional facial image, as shown in FIG. 2.

Figure 3:
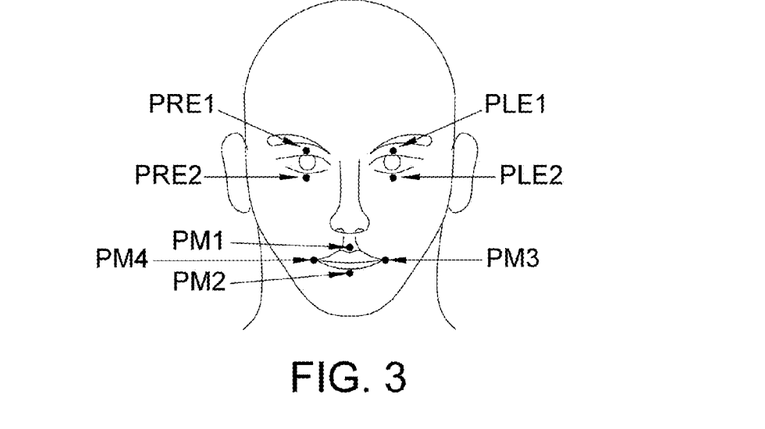
FIG. 3 is a schematic illustration showing second-layer character data DC_L2.
Figure 4:
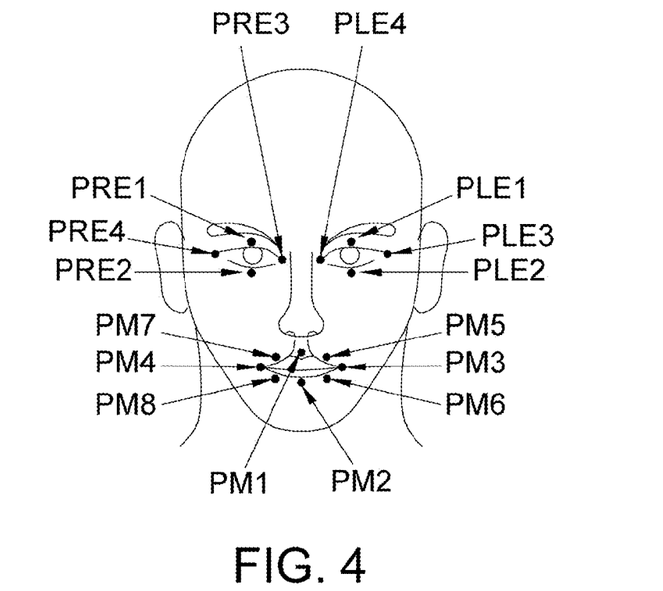
FIG. 4 is a schematic illustration showing third-layer character data DC_L3.

With the increase of the corresponding layers, more character points are applied to describe the facial character to correspondingly provide the character data with the higher fineness degree. The second-layer character data DC_L2 and the third-layer character data DC_L3 respectively describe the facial character of the input video data $V_{IN}$ respectively using the second most and most character points. For example, the number of the character points applied in the second-layer character data DC_L2 is increased to eight, wherein the character points PM1 to PM4 respectively represent the upper edge of mouth, the lower edge of mouth, the left mouth corner and the right mouth corner in the two-dimensional facial image. The character points PLE1, PLE2, PRE1 and PRE2 respectively represent the upper edge of left eye, the lower edge of left eye, the upper edge of right eye and the lower edge of right eye in the two-dimensional facial image, as shown in FIG. 3. For example, the number of the character points applied in the third-layer character data DC_L3 is increased to sixteen, wherein the character points PM1 to PM8 respectively represent the upper edge of mouth, the lower edge of mouth, the left mouth corner, the right mouth corner, the upper-left mouth corner, the lower-left mouth corner, the upper-right mouth corner and the lower-right mouth corner in the two-dimensional facial image. The character points PLE1 to PLE4 and PRE1 to PRE4 respectively represent the upper edge of left eye, the lower edge of left eye, the left canthus of left eye, the right canthus of left eye, the upper edge of right eye, the lower edge of right eye, the left canthus of right eye and the right canthus of right eye in the two-dimensional facial image, as shown in FIG. 4.

For example, the character acquiring device 16 further performs data positioning and character sorting operations on a first frame of the input video data $V_{IN}$ to produce first-layer model data MD_L1, which represent the position of each of the character points PM1, PM2, PLE and PRE in the first frame. In the following character verifying operation, the first-layer model data MD_L1 are regarded as a verification standard for the judgment of whether the first-layer character data DC_L1 is reliable.

The character verifying device 14 obtains first-layer model outline data MDOL_L1 according to the first-layer model data MD_L1, and obtains first-layer character outline data DCOL_L1 according to the first-layer character data DC_L1. For example, the character verifying device 14 obtains the first-layer model outline data MDOL_L1 according to the profile data on a line connecting any two character points in the first-layer model data MD_L1, and obtains the first-layer character outline data DCOL_L1 according to the profile data on a line connecting any two character points in the first-layer character data DC_L1.

The character verifying device 14 further compares the first-layer character outline data DCOL_L1 with the first-layer model outline data MDOL_L1, to judge whether the first-layer character outline data DCOL_L1 and the first-layer model outline data MDOL_L1 satisfy a judgment condition. For example, the judgment condition is the condition that the first-layer model outline data MDOL_L1 and the first-layer character outline data DCOL_L1 approximate each other. For example, the character verifying device 14 compares the profiles of the first-layer character outline data DCOL_L1 and the first-layer model outline data MDOL_L1 with each other according to a possibility density function in a character space. In one embodiment, the possibility density function $P_{model}(u)$ satisfies:

$$P_{model}(u) = \frac{1}{N} \sum_{i=1}^{N} k\left(\left\|\frac{u - u_1}{h}\right\|^2\right),$$

wherein k(x) represents a core model function, which may be any emissive function, such as the Gaussian function; h represents the variation width of the character space; and u represents the center vector of the character model. The value of the possibility density function $P_{model}(u)$ ranges between 0 and 1, for example. When the first-layer character outline data DCOL_L1 and the first-layer model outline data MDOL_L1 get closer to each other, the value of the possibility density function $P_{model}(u)$ approaches 1, otherwise the value of the possibility density function $P_{model}(u)$ approaches 0. The character verifying device 14 judges whether the first-layer character outline data DCOL_L1 and the first-layer model outline data MDOL_L1 satisfy the judgment condition by judging whether the value of the possibility density function $P_{model}(u)$ is greater than a threshold.

When the first-layer character outline data DCOL_L1 and the first-layer model outline data MDOL_L1 satisfy the judgment condition, it represents that the quality (e.g., image resolution) of the input video data $V_{IN}$ is good, so that the reliable first-layer character points can be produced. Thus, the character verifying device 14 drives the character acquiring device 16 to perform acquiring operations of the second-layer character data DC_L2 and the second-layer model data MD_L2 on the input video data $V_{IN}$. The character verifying device 14 further repeatedly performs the operations of obtaining the profile data (the second-layer character outline data DCOL_L2 and the second-layer model outline data MDOL_L2) and comparing the character outline data with the model outline data to judge whether the quality of the input video data $V_{IN}$ is sufficiently good so that the reliable second-layer character points can be produced. The operations of obtaining the second-layer character outline data DCOL_L2, the second-layer model outline data MDOL_L2, the second-layer character outline data DCOL_L2 and the second-layer model outline data MDOL_L2 are respectively similar to the operations of obtaining its corresponding first-layer data. Thus, the associated data acquiring and calculating operations will be omitted.

When the second-layer character outline data DCOL_L2 and the second-layer model outline data MDOL_L2 satisfy the judgment condition, it represents that the quality (e.g., the image resolution) of the input video data $V_{IN}$ is good so that the reliable second-layer character points can be produced. Thus, the character verifying device 14 further performs the operations similar to the operation of driving the character acquiring device 16 to acquire a next-layer character data (the third-layer character data DC_L3 and the third-layer model data MD_L3), the operation of obtaining the profile data (the second-layer character outline data DCOL_L2 and the second-layer model outline data MDOL_L2) and the operation of comparing the character outline data with the model outline data to judge whether the quality of the input video data $V_{IN}$ is sufficiently good so that the reliable third-layer character points can be produced.

When the third-layer character outline data DCOL_L3 and the third-layer model outline data MDOL_L3 satisfy the judgment condition, it represents that the quality (e.g., the image resolution) of the input video data $V_{IN}$ is good so that the reliable third-layer character points can be produced. In one embodiment, the third-layer is, for example, the finest character data layer. Thus, the character verifying device 14 outputs the third-layer character data DC_L3, as the output character data DC_OUT, to the transformation calculating module 12. In other words, the character verifying device 14 increases the number of the character points and the fineness degree of the character data in a gradual manner according to the quality of the input video data $V_{IN}$, so that the character data with the high reliability and the high fineness degree can be obtained.

When the first-layer character outline data DCOL_L1 and the first-layer model outline data MDOL_L1 do not satisfy the judgment condition, it represents that the input do not satisfy the judgment condition and that the quality of the input video data $V_{IN}$ is not good (e.g., the resolution is too low), so that the character point search of more advanced layers (i.e., the second and third-layers) cannot be properly performed. Thus, the character verifying device 14 outputs the first-layer character data DC_L1, as the output character data DC_OUT, to the transformation calculating module 12. Similarly, when the second-layer character outline data DCOL_L2 and the second-layer model outline data MDOL_L2 do not satisfy the judgment condition, it represents that the input video data $V_{IN}$ is not adapted to the character point search of the more advanced layer (i.e., the third-layer). Thus, the character verifying device 14 outputs the second-layer character data DC_L2, as the output character data DC_OUT, to the transformation calculating module 12.

Figure 5:
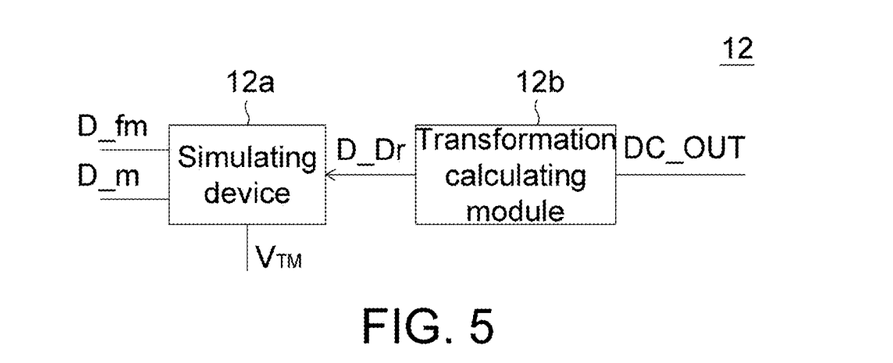
FIG. 5 is a detailed block diagram showing a transformation calculating module 12 of FIG. 1.

The transformation calculating module 12 produces the fundamental facial-mesh transformation data $V_{TM}$ according to the output character data DC_OUT and thus drives the display module 10 to display the 3D facial animation data $V_{3D}$. For example, the transformation calculating module 12 includes a simulating device 12a and a transformation calculating device 12b, as shown in FIG. 5. The simulating device 12a defines a first-layer virtual muscle group, a second-layer virtual muscle group and a third-layer virtual muscle group on the fundamental facial mesh model based on the facial muscle distribution information D_fm and the fundamental facial mesh model information D_m.

Figure 16:
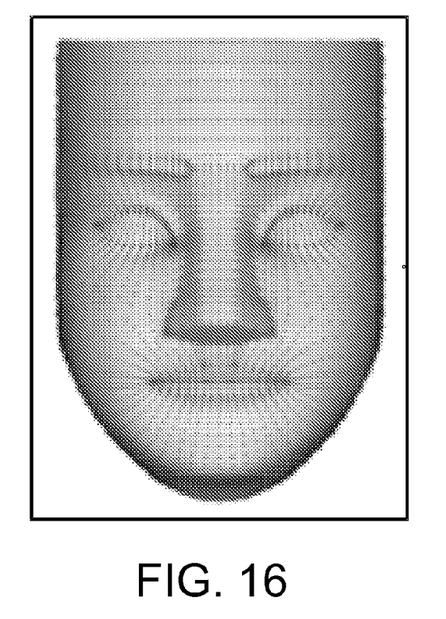
FIG. 16 shows a fundamental facial mesh model.
Figure 17:
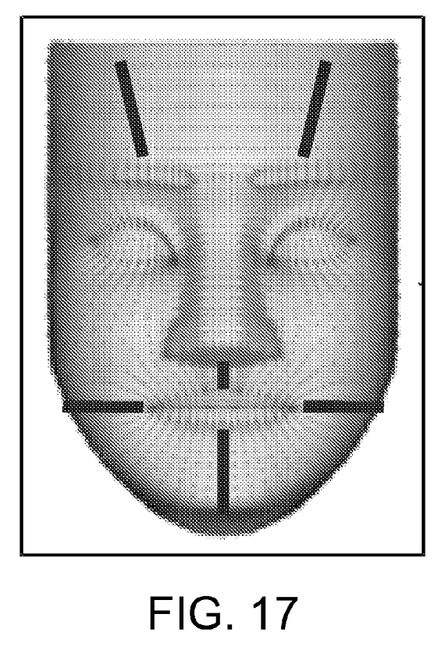
FIG. 17 shows the first-layer virtual muscle groups on the fundamental facial mesh model.
Figure 18:
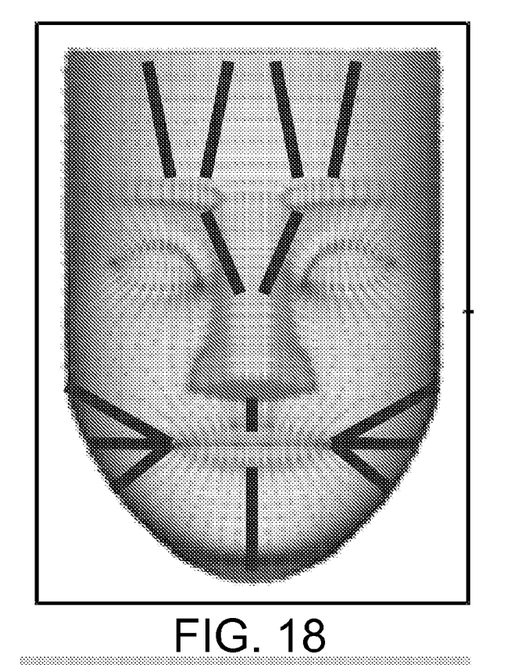
FIG. 18 shows the second-layer virtual muscle groups on the fundamental facial mesh model.
Figure 19:
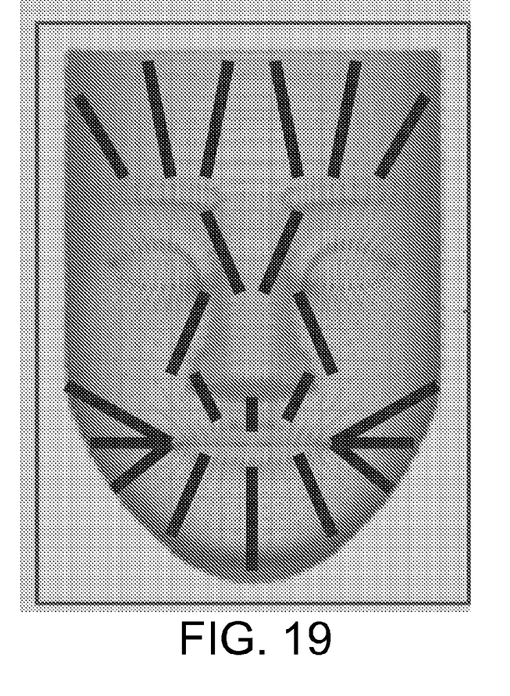
FIG. 19 shows the third-layer virtual muscle groups on the fundamental facial mesh model.

For example, the fundamental facial mesh model is shown in the FIG. 16, and the first-layer to third-layer virtual muscle groups on the fundamental facial mesh model are shown in the FIGS. 17 to 19. As shown in these drawings, the lower-layer virtual muscle group includes fewer muscles. For example, the first-layer virtual muscle group only includes two muscles on the forehead portion, and four muscles on top, bottom, left and right sides of the mouth corner. The number of the virtual muscles on the more advanced layer is higher. For example, the second-layer virtual muscle group includes six muscles defined in the first-layer virtual muscle group, and additional two and four muscles respectively disposed on the forehead portion and the mouth corner portion, and additional two muscles defined between the eyes and the noise ridge. The first to third virtual muscle groups are arranged with reference to the technology of human body anatomy, and can pull several corresponding nodes on the fundamental facial mesh model so as to produce the corresponding transformation on the facial mesh model. For example, a spring model is applied between any two nodes on the fundamental facial mesh model so that the first-layer (or second-layer or third-layer) virtual muscle group can control the fundamental facial mesh model to produce the corresponding transformation in response to the driving information D_DR, and thus to produce the fundamental facial-mesh transformation data $V_{TM}$.

The transformation calculating device 12b calculates displacement quantities and displacement directions corresponding to these first-layer (or second-layer or third-layer) character points according to output character data DC_OUT, and thus produces the corresponding driving information D_DR. For example, the transformation calculating device 12b adopts the conversion technology to convert the character point displacement quantities and the character point displacement directions in the two-dimensional image into the character point displacement quantities and the character point displacement directions in the corresponding 3D image. The transformation calculating device 12b also converts the character point displacement quantities and the character point displacement directions of the 3D image into the first-layer (or second-layer or third-layer) driving information D_DR for driving the first-layer (or second-layer or third-layer) virtual muscle group, and provides the driving information D_DR to the simulating device 12a to drive the simulating device 12a to produce the fundamental facial-mesh transformation data $V_{TM}$, according to which the transformation displacement quantity and displacement direction of each of the mesh nodes in this fundamental facial mesh model are determined.

Figure 6:
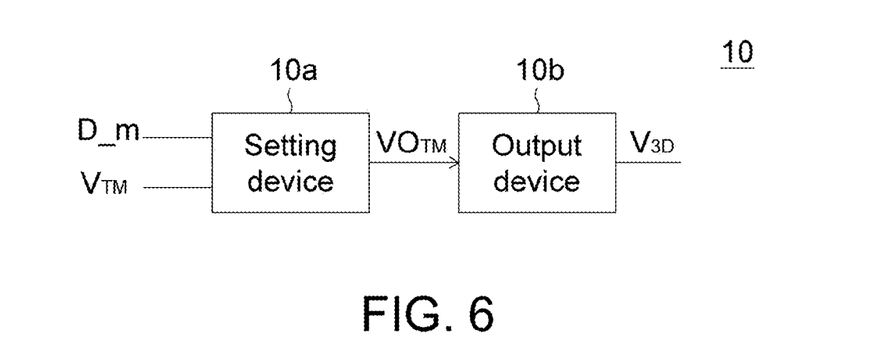
FIG. 6 is a detailed block diagram showing a display module 10 of FIG. 1.

The display module 10 includes, for example, a setting device 10a and an output device 10b, as shown in FIG. 6. The setting device 10a maps the fundamental facial-mesh transformation data $V_{TM}$ to the actual output facial mesh model to cause the corresponding transformation on the actual output facial mesh model so that the actual output facial-mesh transformation data $VO_{TM}$ is determined. The output device 10b displays the 3D facial animation data $V_{3D}$ according to the actual output facial-mesh transformation data $VO_{TM}$. The actual output facial mesh model defines the facial model, which is actually seen by the user or animal, when the 3D facial animation data $V_{3D}$ are outputted. The actual output facial mesh model may have the facial features specified by the user or animal.

In one example, the mapping relationship between the fundamental facial mesh model of the user or animal and the actual output facial mesh model may be determined by manually clicking in order to determine how to map the actual output facial-mesh transformation data $VO_{TM}$ according to the fundamental facial-mesh transformation data $V_{TM}$. For example, the mesh node corresponding to each facial character in the fundamental facial-mesh transformation data $V_{TM}$ of the user or animal manually corresponds to the mesh node corresponding to each facial character on the actual output facial mesh model. The transformation displacement quantity and direction of each mesh node are obtained by way of interpolation according to the corresponding distance between the facial character of the user or animal and the mesh node. Thus, the operation of mapping the fundamental facial-mesh transformation data $V_{TM}$ to produce the actual output facial-mesh transformation data $VO_{TM}$ can be finished.

For example, the number of mesh nodes of the actual output facial mesh model may be selectively set. In one embodiment, the output device 10b has the lower calculation efficiency, and the actual output facial mesh model is set to have the reduced number of mesh nodes (compared with the fundamental facial mesh model), so that the correspondingly produced actual output facial-mesh transformation data $VO_{TM}$ have the lower facial expression fineness. Thus, the setting device 10a can provide the more simplified actual output facial-mesh transformation data $VO_{TM}$ than the fundamental facial-mesh transformation data $V_{TM}$ to drive the output device 10b by mapping to the output device 10b having the lower calculation efficiency.

Figure 7:
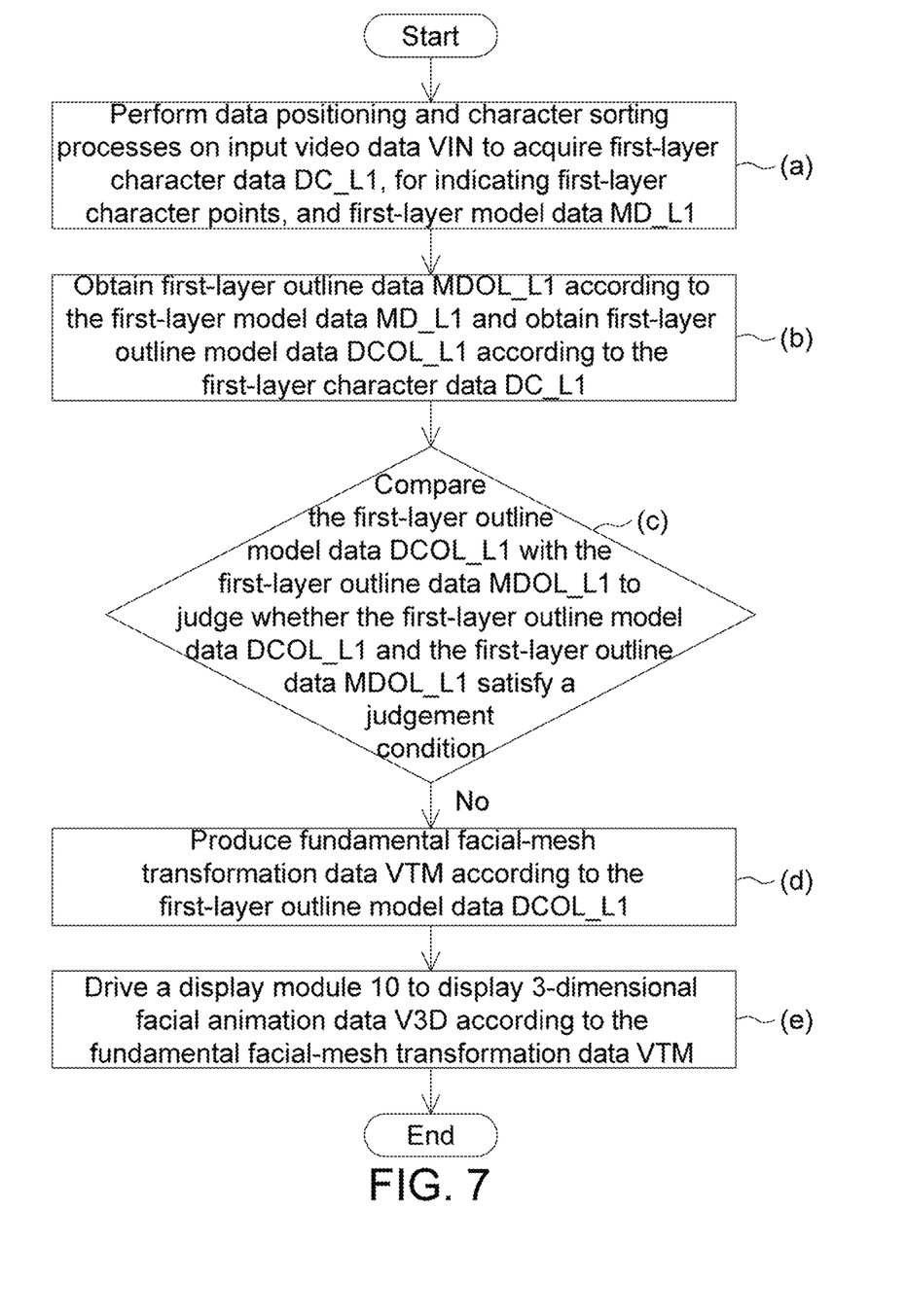
FIG. 7 is a flow chart showing a facial animation production method according to the first embodiment of the disclosure.

FIG. 7 is a flow chart showing a facial animation production method according to the first embodiment of the disclosure. Referring to FIG. 7, the facial animation production method of this embodiment includes, for example, the following steps. First, as shown in step (a), the character acquiring device 16 performs data positioning and character sorting processes on the input video data $V_{IN}$ to acquire the first-layer character data DC_L1, for indicating multiple first-layer character points, and the first-layer model data MD_L1. Next, as shown in step (b), the character verifying device 14 obtains the first-layer model outline data MDOL_L1 according to the first-layer model data MD_L1, and obtains the first-layer character outline data DCOL_L1 according to the first-layer character data DC_L1.

Then, as shown in step (c), the character verifying device 14 compares the first-layer character outline data DCOL_L1 with the first-layer model outline data MDOL_L1 to judge whether the first-layer character outline data DCOL_L1 and the first-layer model outline data MDOL_L1 satisfy the judgment condition.

When the first-layer character outline data DCOL_L1 and the first-layer model outline data MDOL_L1 do not satisfy the judgment condition, step (d) is performed, in which the character verifying device 14 judges that the quality of the input video data $V_{IN}$ is not good enough so that the character points of the reliable and more advanced layers (i.e., the second and third-layers) cannot be produced, and outputs the first-layer character data DC_L1, as the output character data DC_OUT, to the transformation calculating module 12 to correspondingly drive the transformation calculating module 12 to produce the fundamental facial-mesh transformation data $V_{TM}$. Then, as shown in step (e), the transformation calculating module 12 drives the display module 10 to display the 3D facial animation data $V_{3D}$ according to the fundamental facial-mesh transformation data $V_{TM}$.

Figure 8:
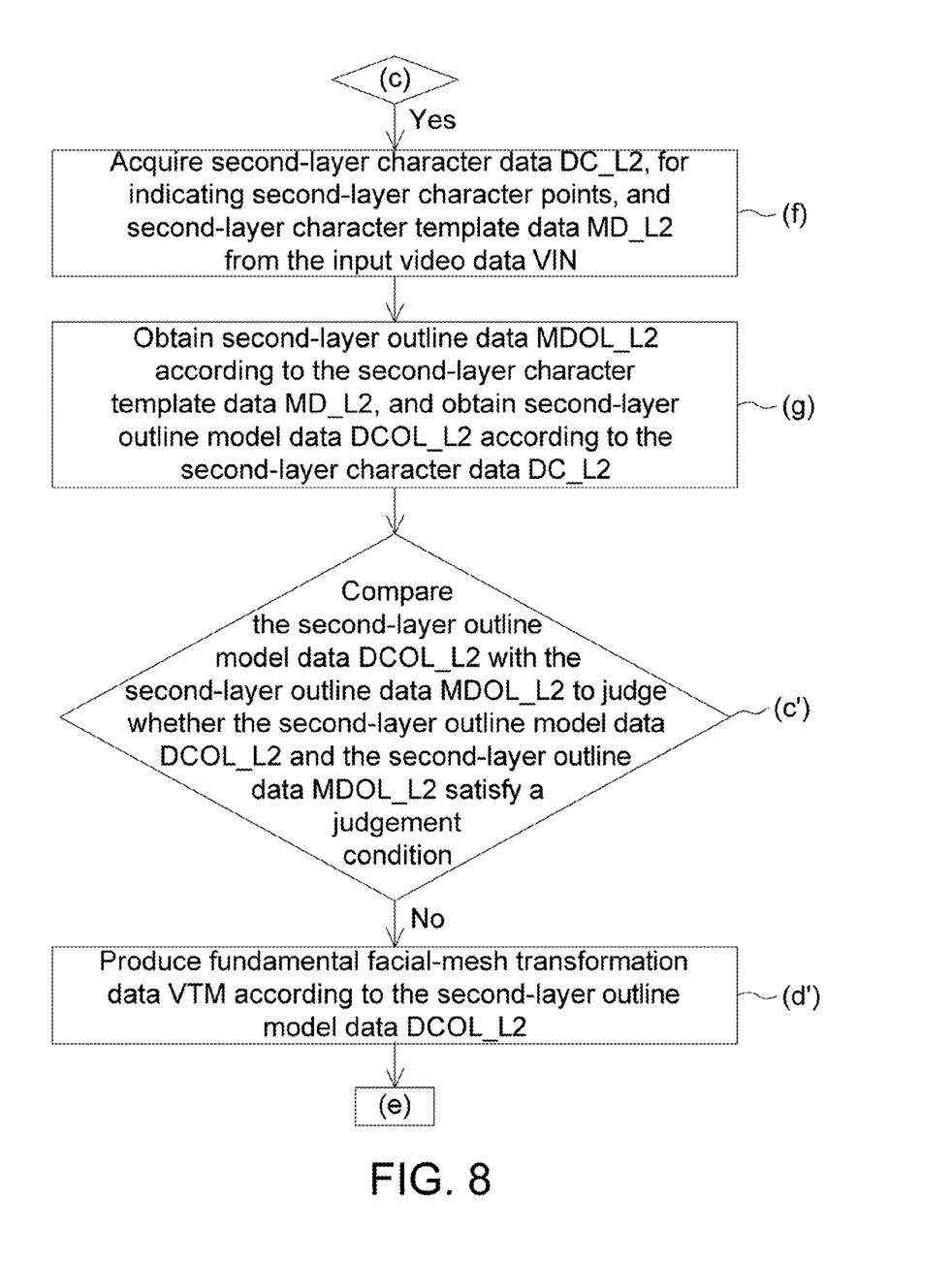
FIGS. 8 to 13 are partial flow charts showing the facial animation production method according to the first embodiment of the disclosure.

FIG. 8 is a partial flow chart showing the facial animation production method according to the first embodiment of the disclosure. When the first-layer character outline data DCOL_L1 and the first-layer model outline data MDOL_L1 satisfy the judgment condition, step (f) is performed, in which the character verifying device 14 drives the character acquiring device 16 to acquire the second-layer character data DC_L2, for indicating multiple second-layer character points, and the second-layer model data MD_L2 from the input video data $V_{IN}$. Next, as shown in step (g), the character verifying device 14 obtains the second-layer model outline data MDOL_L2 according to the second-layer model data MD_L2, and obtains the second-layer character outline data DCOL_L2 according to the second-layer character data DC_L2. Then, as shown in step (c'), the character verifying device 14 further compares the second-layer character outline data DCOL_L2 with the second-layer model outline data MDOL_L2 to judge whether the second-layer character outline data DCOL_L2 and the second-layer model outline data MDOL_L2 satisfy the judgment condition.

When the second-layer character outline data DCOL_L2 and the second-layer model outline data MDOL_L2 do not satisfy the judgment condition, step (d') is performed, in which the character verifying device 14 judges that the quality of the input video data $V_{IN}$ is not good enough so that the character points of the reliable and more advanced layer (i.e., the third-layer) cannot be produced, and outputs the second-layer character data DC_L2, as the output character data DC_OUT, to the transformation calculating module 12 to correspondingly drive the transformation calculating module 12 to produce the fundamental facial-mesh transformation data $V_{TM}$. Thereafter, the step (e) is repeated to correspondingly display the 3D facial animation data $V_{3D}$.

Figure 9:
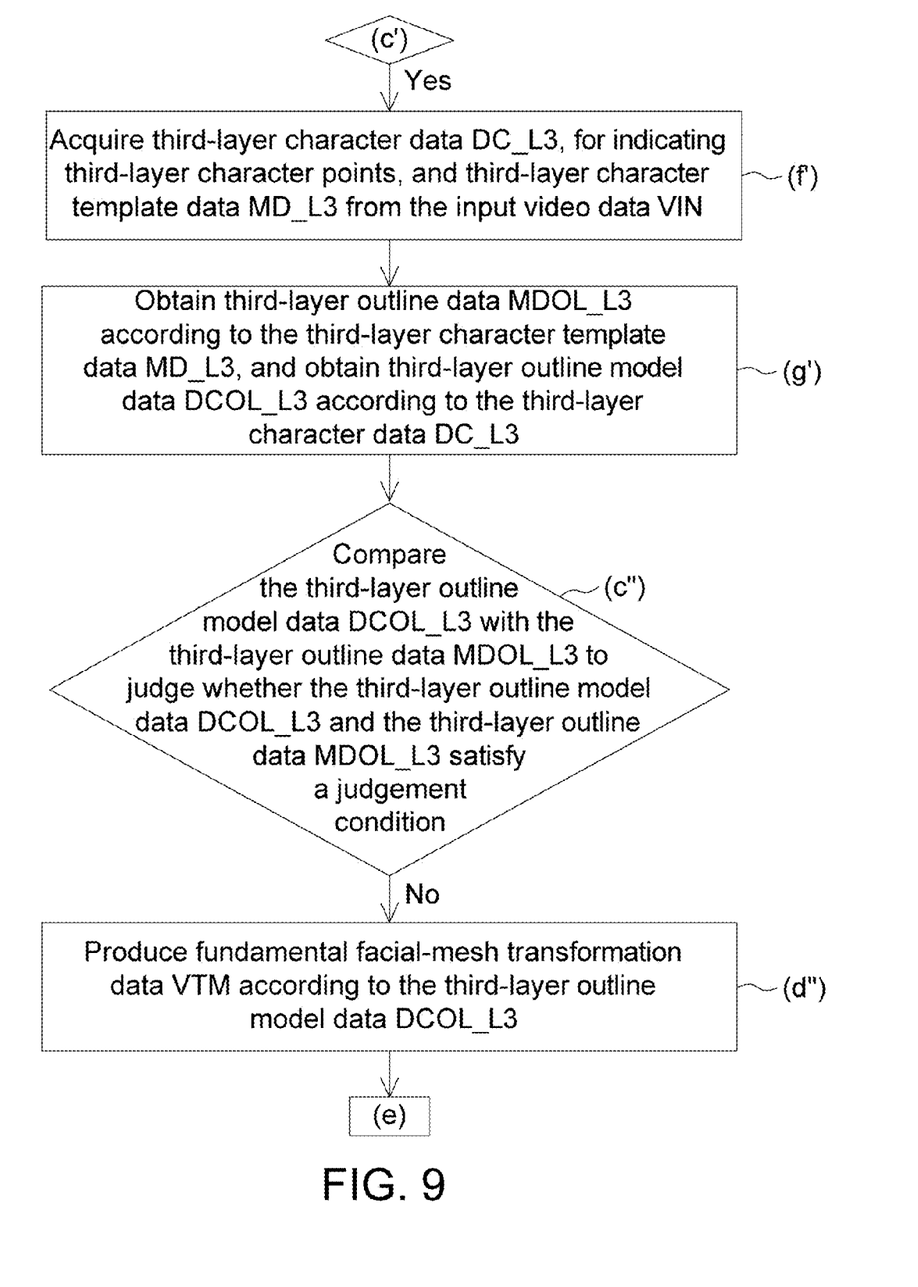

FIG. 9 is a partial flow chart showing the facial animation production method according to the first embodiment of the disclosure. When the second-layer character outline data DCOL_L2 and the second-layer model outline data MDOL_L2 satisfy the judgment condition, step (f') is performed, in which the character verifying device 14 drives the character acquiring device 16 to acquire the third-layer character data DC_L3, for indicating multiple third-layer character points, and the third-layer model data MD_L3 from the input video data $V_{IN}$. Next, as shown in step (g'), the character verifying device 14 obtains the third-layer model outline data MDOL_L3 according to the third-layer model data MD_L3, and obtains the third-layer character outline data DCOL_L3 according to the third-layer character data DC_L3. Then, as shown in step (c''), the character verifying device 14 further compares the third-layer character outline data DCOL_L3 with the third-layer model outline data MDOL_L3 to judge whether the third-layer character outline data DCOL_L3 and the third-layer model outline data MDOL_L3 satisfy the judgment condition.

When the third-layer character outline data DCOL_L3 and the third-layer model outline data MDOL_L3 do not satisfy the judgment condition, step (d'') is performed, in which the character verifying device 14 judges that the quality of the input video data $V_{IN}$ is not good enough so that the character points of the reliable and more advanced layer (i.e., the fourth level) cannot be produced, and outputs the third-layer character data DC_L3, as the output character data DC_OUT, to the transformation calculating module 12 to correspondingly drive the transformation calculating module 12 to produce the fundamental facial-mesh transformation data $V_{TM}$. Thereafter, the step (e) is repeated to correspondingly display the 3D facial animation data $V_{3D}$.

In one example, the third-layer is the finest character data layer. Therefore, even if the third-layer character outline data DCOL_L3 and the third-layer model outline data MDOL_L3 satisfy the judgment condition, the character verifying device 14 does not acquire the fourth-layer character data any more, but outputs the third-layer character data DC_L3, as the output character data DC_OUT, to the transformation calculating module 12.

Figure 10:
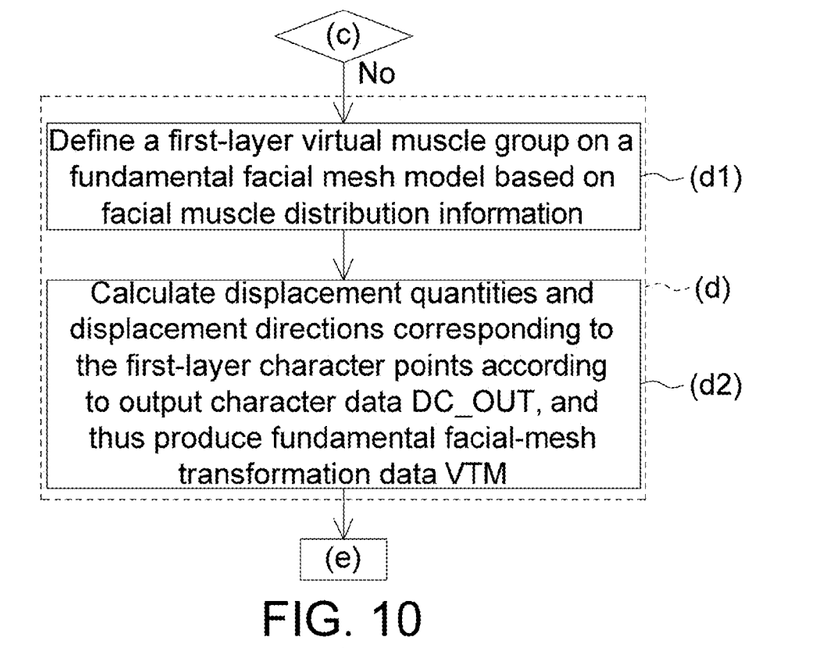

FIG. 10 is a detailed flow chart showing the step (d) of FIG. 7. For example, the step (d) includes steps (d1) and (d2). As shown in the step (d1), the simulating device 12a defines the first-layer virtual muscle group on the fundamental facial mesh model based on the facial muscle distribution information. Next, as shown in the step (d2), the transformation calculating device 12b calculates the displacement quantities and displacement directions corresponding to the first-layer character points according to the output character data DC_OUT, and thus produces and outputs the first-layer driving information to the simulating device 12a. Thus, the simulating device 12a can control the fundamental facial mesh model to produce the corresponding transformation according to the first-layer virtual muscle group so as to produce the fundamental facial-mesh transformation data $V_{TM}$. A spring model is applied between two nodes on the fundamental facial mesh model to simulate its transformation condition under the action of force.

Figure 11:
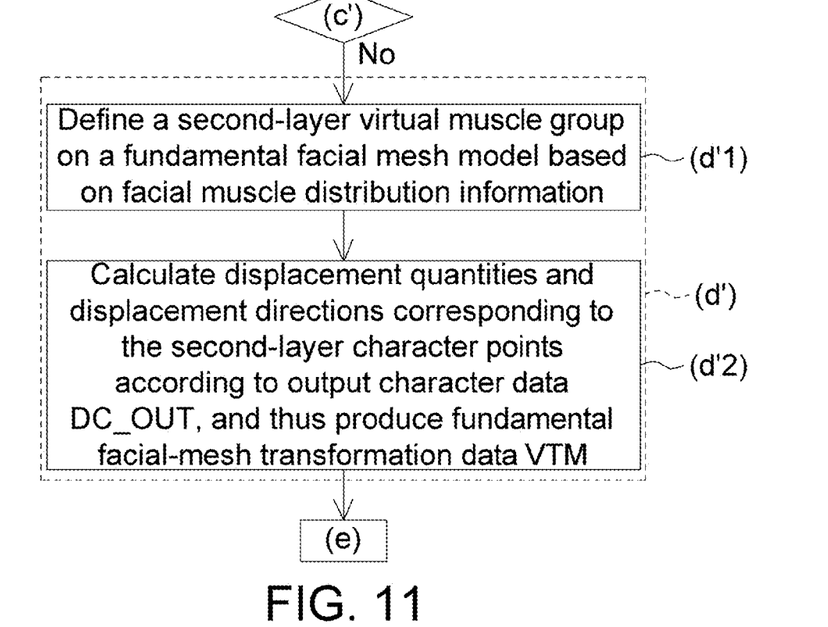
Figure 12:
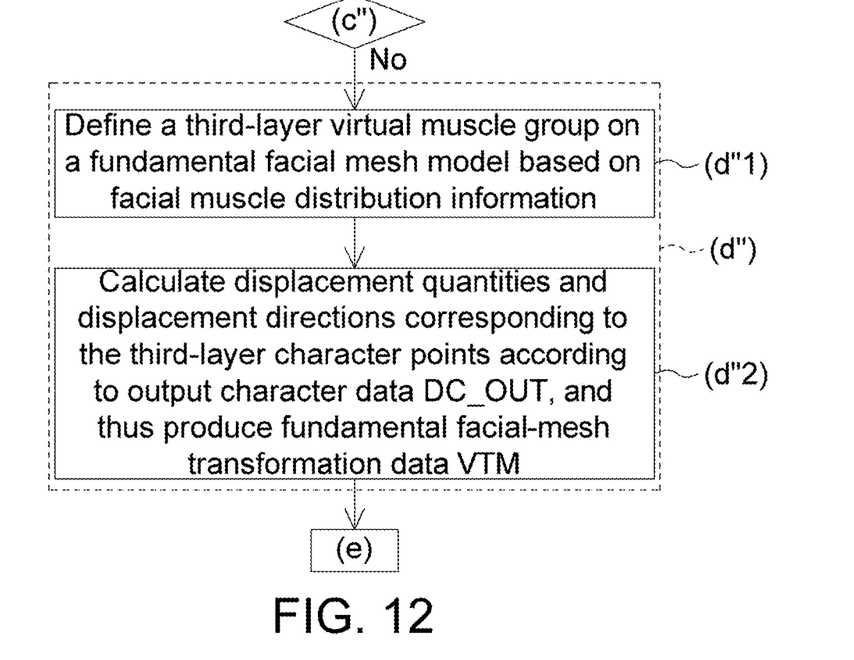

FIGS. 11 and 12 are respectively detailed flow charts showing the step (d') of FIG. 8 and the step (d") of FIG. 9. Similar to the step (d), steps (d') and (d") also include the similar detailed steps (d'1) and (d'2) and (d"1) and (d"2). However, the contents thereof are similar to the detailed steps (d1) and (d2) of the step (d). Thus, detailed descriptions thereof will be omitted.

Figure 13:
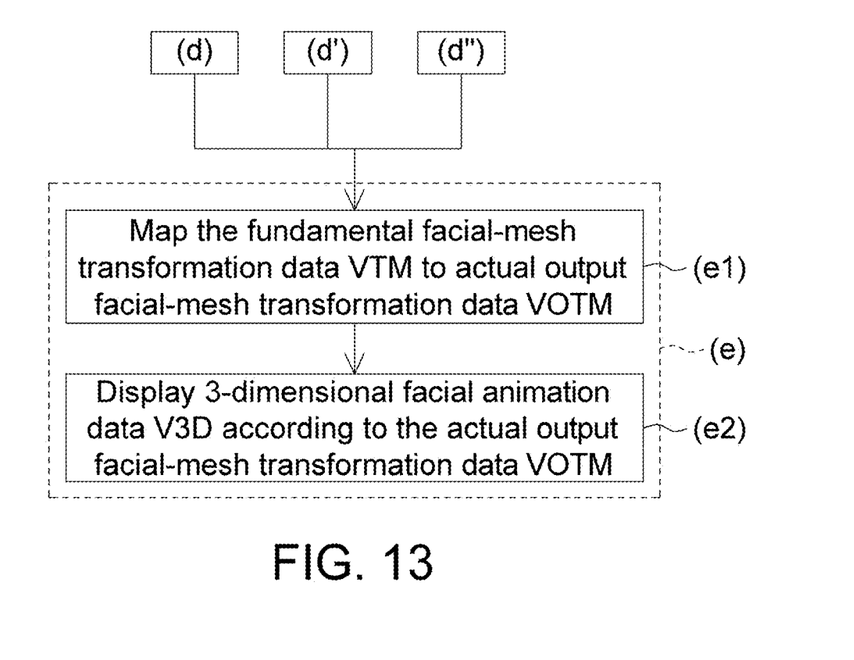

FIG. 13 is a detailed flow chart showing the step (e) of FIGS. 7 to 9. For example, the step (e) includes steps (e1) and (e2). As shown in the step (e1), the setting device 10a maps the fundamental facial-mesh transformation data $V_{TM}$ to the actual output facial-mesh transformation data $VO_{TM}$. Next, as shown in the step (e2), the output device 10b displays the 3D facial animation data $V_{3D}$ according to the actual output facial-mesh transformation data $VO_{TM}$.

Second Embodiment

Figure 14:
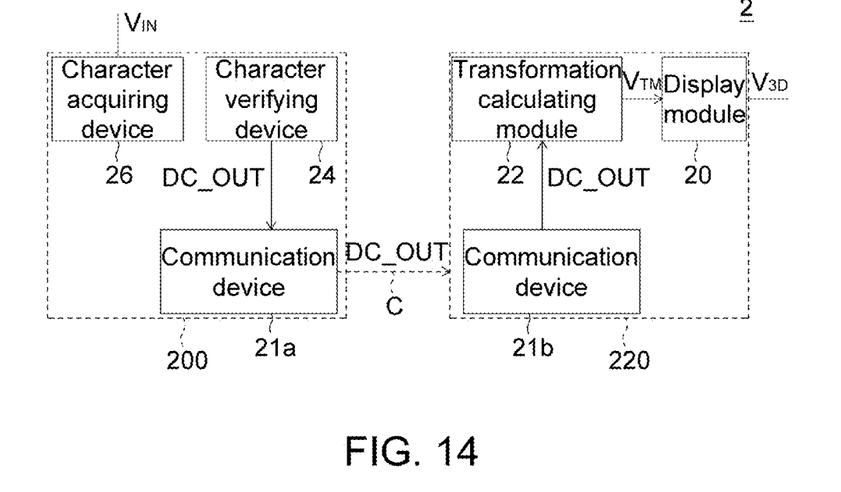
FIG. 14 is a block diagram showing a facial animation system according to a second embodiment of the disclosure.

The facial animation system according to the second embodiment of the disclosure adopts communication devices to perform the data transmission between the character verifying device and the transformation calculating module. The character acquiring device and the character verifying device are disposed at a remote end of the display module and the transformation calculating module. FIG. 14 is a block diagram showing a facial animation system 2 according to the second embodiment of the disclosure. As shown in FIG. 14, the difference between the facial animation system 2 and the facial animation system 1 resides in that the facial animation system 2 utilizes communication devices 21a and 21b to perform the data transmission between a character verifying device 24 and a transformation calculating module 22.

In this example, the character acquiring device 26, the character verifying device 24 and the communication device 21a may be integrated into an independent handheld device 200, and the transformation calculating module 22, the display module 20 and the communication device 21b may be integrated into a post-end processing device 220. The few output character point data can be transmitted through the communication link C between the handheld communication device 200 and the post-end processing device 220 so that the operation of producing the corresponding 3D facial animation data $V_{3D}$ in response to the input video data $V_{IN}$ received on the side of the handheld device 200 can be finished.

Third Embodiment

Figure 15:
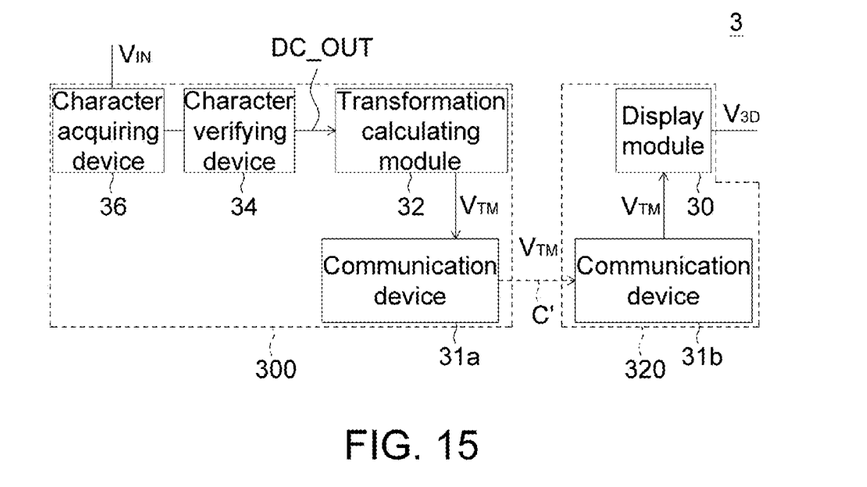
FIG. 15 is a block diagram showing a facial animation system according to a third embodiment of the disclosure.

The facial animation system according to this embodiment of the disclosure adopts the communication devices to perform the data transmission between the transformation calculating module and the display module. The character acquiring device, the character verifying device and the transformation calculating module are disposed at the remote end of the display module. FIG. 15 is a block diagram showing a facial animation system 3 according to a third embodiment of the disclosure. As shown in FIG. 15, the difference between the facial animation system 3 and the facial animation system 2 resides in that the facial animation system 3 adopts the communication devices 31a and 31b to perform the data transmission between the transformation calculating module 32 and the display module 30.

In this example, the character acquiring device 36, the character verifying device 34, the transformation calculating module 32 and the communication device 31a may be integrated into an independent handheld device 300, while the display module 30 and the communication device 31b may be integrated into a post-end processing device 320. Thus, the few output fundamental facial-mesh transformation data can be transmitted through the communication link C' between the handheld communication device 300 and the post-end processing device 320 in the facial animation system 3. Thus, the operation of producing the corresponding 3D facial animation data $V_{3D}$ in response to the input video data $V_{IN}$, received on the side of the handheld device 300, can be finished.

The facial animation system according to the embodiment of the disclosure adopts the multi-layer character verifying mechanism to verify the character point information, produced according to the two-dimensional facial image, and can selectively obtain the character point information with different fineness levels according to two-dimensional facial images with different image qualities. Thus, compared with the conventional 3D facial animation system, the facial animation system according to the embodiment of the disclosure can ensure its referred character point is reliable, so that the 3D facial animation with the higher quality can be advantageously produced.

In addition, the facial animation system according to the embodiment of the disclosure adopts the transformation calculating module to convert the character point information into the corresponding facial expression transformation information through the facial muscle model, the spring model and the fundamental facial mesh model. Thus, compared with the conventional facial animation system, the facial animation system according to the embodiment of the disclosure can advantageously produce the corresponding 3D facial animation according to the character point information without establishing the facial expression database in advance.

While the disclosure has been described by way of example and in terms of a preferred embodiment, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A facial animation system for producing 3-dimensional (3D) facial animation data in response to input video data, the input video data comprising a first frame, the facial animation system comprising:
   a display module;
   a transformation calculating module;
   a character acquiring device for performing data positioning and character sorting operations on the input video data to acquire first-layer character data according to the peak value of the variance of pixel data gray level of the input video data, for indicating a plurality of first-layer character points, and performing data positioning and character sorting operations on the first frame of the input video data to acquire first-layer model data; and
   a character verifying device for obtaining first-layer model outline data according to the first-layer model data, and obtaining first-layer character outline data according to the first-layer character data, the character verifying device further comparing the first-layer character outline data with the first-layer model outline data to judge whether the first-layer character outline data and the first-layer model outline data satisfy a judgment condition;
   wherein when the first-layer character outline data and the first-layer model outline data do not satisfy the judgment condition, the character verifying device outputs the first-layer character data, as output character data, to the transformation calculating module;
   wherein the transformation calculating module produces fundamental facial-mesh transformation data according to the output character data, and thus drives the display module to display the 3D facial animation data.

2. The system according to claim 1, wherein the transformation calculating module comprises:
   a simulating device for defining a first-layer virtual muscle group on a fundamental facial mesh model based on facial muscle distribution information; and
   a transformation calculating device for calculating displacement quantities and displacement directions corresponding to the first-layer character points according to the output character data, and thus producing first-layer driving information and driving the first-layer virtual muscle group to control the fundamental facial mesh model to produce corresponding transformation and thus to produce the fundamental facial-mesh transformation data.

3. The system according to claim 2, wherein a spring model is applied between two nodes on the fundamental facial mesh model, so that the first-layer virtual muscle group can control the fundamental facial mesh model to produce the corresponding transformation in response to the first-layer driving information to produce the fundamental facial-mesh transformation data.

4. The system according to claim 1, wherein the display module comprises:
   a setting device for mapping the fundamental facial-mesh transformation data to actual output facial-mesh transformation data; and
   an output device for displaying the 3D facial animation data according to the actual output facial-mesh transformation data.

5. The system according to claim 1, wherein when the first-layer character outline data and the first-layer model outline data satisfy the judgment condition, the character verifying device drives the character acquiring device to acquire second-layer model data and second-layer character data, for indicating a plurality of second-layer character points, from the input video data;
   wherein the character verifying device further obtains second-layer character outline data and second-layer model outline data according to the second-layer character data and the second-layer model data, respectively, and compares the second-layer character outline data with the second-layer model outline data to judge whether the second-layer character outline data and the second-layer model outline data satisfy the judgment condition.

6. The system according to claim 5, wherein when the second-layer character outline data and the second-layer model outline data do not satisfy the judgment condition, the character verifying device outputs the first and second-layer character data, as the output character data, to the transformation calculating module, and the transformation calculating module produces the fundamental facial-mesh transformation data according to the output character data, and thus drives the display module to display the 3D facial animation data.

7. The system according to claim 6, wherein the transformation calculating module comprises:
   a simulating device for defining a second-layer virtual muscle group on a fundamental facial mesh model based on facial muscle distribution information; and
   a transformation calculating device for calculating displacement quantities and displacement directions corresponding to the second-layer character points according to the output character data, and thus producing second-layer driving information to drive the second-layer virtual muscle group to control the fundamental facial mesh model to produce corresponding transformation and thus to produce the fundamental facial-mesh transformation data.

8. The system according to claim 7, wherein a spring model is applied between two nodes on the fundamental facial mesh model, so that the second-layer virtual muscle group can control the fundamental facial mesh model to produce the corresponding transformation in response to the second-layer driving information.

9. The system according to claim 6, wherein the display module comprises:
   a setting device for mapping the fundamental facial-mesh transformation data to actual output facial-mesh transformation data; and
   an output device for displaying the 3D facial animation data according to the actual output facial-mesh transformation data.

10. The system according to claim 5, wherein when the second-layer character outline data and the second-layer model outline data satisfy the judgment condition, the character verifying device drives the character acquiring device to acquire third-layer model data and third-layer character data, for indicating a plurality of third-layer character points, from the input video data;
   wherein the character verifying device further obtains third-layer character outline data and third-layer model outline data according to the third-layer character data and the third-layer model data, respectively, and compares the third-layer character outline data with the third-layer model outline data to judge whether the third-layer character outline data and the third-layer model outline data satisfy the judgment condition.

11. The system according to claim 10, wherein when the third-layer character outline data and the third-layer model outline data do not satisfy the judgment condition, the character verifying device outputs the third-layer character data, as the output character data, to the transformation calculating module, and the transformation calculating module produces the fundamental facial-mesh transformation data according to the output character data, and thus drives the display module to display the 3D facial animation data.

12. The system according to claim 11, wherein the transformation calculating module comprises:
  a simulating device for defining a third-layer virtual muscle group on a fundamental facial mesh model based on facial muscle distribution information; and
  a transformation calculating device for calculating displacement quantities and displacement directions corresponding to the third-layer character points according to the output character data, and thus producing third-layer driving information to drive the third-layer virtual muscle group to control the fundamental facial mesh model to produce corresponding transformation and thus to produce the fundamental facial-mesh transformation data.

13. The system according to claim 12, wherein a spring model is applied between two nodes of the fundamental facial mesh model, so that the third-layer virtual muscle group can control the fundamental facial mesh model to produce the corresponding transformation in response to the third-layer driving information.

14. The system according to claim 11, wherein the display module comprises:
  a setting device for mapping the fundamental facial-mesh transformation data to actual output facial-mesh transformation data; and
  an output device for displaying the 3D facial animation data according to the actual output facial-mesh transformation data.

15. The system according to claim 1, wherein the character acquiring device and the character verifying device are disposed at a remote end of the display module and the transformation calculating module, and the facial animation system further comprises:
  a first communication device for receiving the output character data and outputting the output character data through a communication link; and
  a second communication device for receiving the output character data through the communication link, and providing the output character data to the transformation calculating module and the display module.

16. The system according to claim 1, wherein the character acquiring device, the character verifying device and the transformation calculating module are disposed at a remote end of the display module, and the facial animation system further comprises:
  a first communication device for receiving the fundamental facial-mesh transformation data and outputting the fundamental facial-mesh transformation data through a communication link; and
  a second communication device for receiving the fundamental facial-mesh transformation data through the communication link and providing the fundamental facial-mesh transformation data to the display module.

17. A facial animation production method for producing 3-dimensional (3D) facial animation data in response to input video data, the input video data comprising a first frame, the facial animation production method comprising the steps of:
  performing data positioning and character sorting processes on the input video data to acquire first-layer character data according to the peak value of the variance of pixel data gray level of the input video data, for indicating a plurality of first-layer character points, and performing data positioning and character sorting operations on the first frame of the input video data to acquire first-layer model data;
  obtaining first-layer model outline data according to the first-layer model data, and obtaining first-layer character outline data according to the first-layer character data;
  comparing the first-layer character outline data with the first-layer model outline data to judge whether the first-layer character outline data and the first-layer model outline data satisfy a judgment condition;
  producing output character data according to the first-layer character data and thus producing fundamental facial-mesh transformation data when the first-layer character outline data and the first-layer model outline data do not satisfy the judgment condition; and
  displaying the 3D facial animation data according to the fundamental facial-mesh transformation data.

18. The method according to claim 17, wherein the step of producing the fundamental facial-mesh transformation data comprises:
  defining a first-layer virtual muscle group on a fundamental facial mesh model based on facial muscle distribution information; and
  calculating displacement quantities and displacement directions corresponding to the first-layer character points according to the output character data, and thus producing first-layer driving information to drive the first-layer virtual muscle group to control the fundamental facial mesh model to produce corresponding transformation and thus to produce the fundamental facial-mesh transformation data.

19. The method according to claim 18, wherein in the step of producing the fundamental facial-mesh transformation data, a spring model is applied between two nodes on the fundamental facial mesh model.

20. The method according to claim 17, wherein the step of displaying the 3D facial animation data comprises:
  mapping the fundamental facial-mesh transformation data to actual output facial-mesh transformation data; and
  displaying the 3D facial animation data according to the actual output facial-mesh transformation data.

21. The method according to claim 17, further comprising the steps of:
  acquiring second-layer character data, for indicating a plurality of second-layer character points, and second-layer model data from the input video data when the first-layer character outline data and the first-layer model outline data satisfy the judgment condition;
  obtaining second-layer model outline data according to the second-layer model data, and obtaining second-layer character outline data according to the second-layer character data; and
  comparing the second-layer character outline data with the second-layer model outline data to judge whether the second-layer character outline data and the second-layer model outline data satisfy the judgment condition.

22. The method according to claim 21, further comprising the step of:

producing the fundamental facial-mesh transformation data according to the second-layer character data when the second-layer character outline data and the second-layer model outline data do not satisfy the judgment condition.

23. The method according to claim 21, further comprising the steps of:
acquiring third-layer character data, for indicating a plurality of third-layer character points, and third-layer model data from the input video data when the second-layer character outline data and the second-layer model outline data satisfy the judgment condition;
obtaining third-layer model outline data according to the third-layer model data, and obtaining third-layer character outline data according to the third-layer character data; and
comparing the third-layer character outline data with the third-layer model outline data to judge whether the third-layer character outline data and the third-layer model outline data satisfy the judgment condition.

24. The method according to claim 23, further comprising the step of:
producing the fundamental facial-mesh transformation data according to the third-layer character data when the third-layer character outline data and the third-layer model outline data do not satisfy the judgment condition.

* * * * *